United States Patent
Browne et al.

(10) Patent No.: US 7,556,313 B2
(45) Date of Patent: Jul. 7, 2009

(54) ACTIVE MATERIAL ACTUATED HEADREST ASSEMBLIES

(75) Inventors: Alan L. Browne, Grosse Pointe, MI (US); Nancy L. Johnson, Northville, MI (US); James Y. Khoury, Macomb, MI (US); Paul W. Alexander, Ypsilanti, MI (US); Michael G. Carpenter, Romeo, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 105 days.

(21) Appl. No.: 11/554,753

(22) Filed: Oct. 31, 2006

(65) Prior Publication Data

US 2007/0188004 A1    Aug. 16, 2007

Related U.S. Application Data

(60) Provisional application No. 60/733,573, filed on Nov. 4, 2005, provisional application No. 60/792,520, filed on Apr. 17, 2006.

(51) Int. Cl.
*B60N 2/48* (2006.01)
*B60N 2/42* (2006.01)

(52) U.S. Cl. .................................. 297/216.12; 297/391

(58) Field of Classification Search ............ 297/216.12, 297/216.13, 216.14, 391
See application file for complete search history.

(56) References Cited

U.S. PATENT DOCUMENTS

| | | | | |
|---|---|---|---|---|
| 3,802,737 | A | * | 4/1974 | Mertens .................... 297/216.2 |
| 5,820,211 | A | * | 10/1998 | Heilig et al. ............ 297/216.12 |
| 5,842,738 | A | * | 12/1998 | Knoll et al. ............. 297/216.12 |
| 6,079,776 | A | * | 6/2000 | Breitner et al. ......... 297/216.12 |
| 6,213,548 | B1 | * | 4/2001 | Van Wynsberghe et al. ...................... 297/216.12 |
| 6,331,014 | B1 | * | 12/2001 | Breed ....................... 280/730.1 |
| 6,530,564 | B1 | * | 3/2003 | Julien ......................... 267/147 |
| 6,688,697 | B2 | | 2/2004 | Baumann et al. |
| 6,805,404 | B1 | * | 10/2004 | Breed ...................... 297/216.12 |
| 6,910,714 | B2 | * | 6/2005 | Browne et al. ............... 280/753 |
| 7,070,235 | B2 | * | 7/2006 | Schilling et al. ........ 297/216.12 |
| 2004/0195815 | A1 | * | 10/2004 | Browne et al. .............. 280/753 |
| 2007/0241593 | A1 | * | 10/2007 | Woerner ................. 297/216.12 |

FOREIGN PATENT DOCUMENTS

DE           19951966 A1      5/2001

* cited by examiner

*Primary Examiner*—David Dunn
*Assistant Examiner*—Patrick Lynch

(57) ABSTRACT

A headrest assembly for a seat includes a body portion having at least one padded surface positioned in substantial alignment with a seated occupant's head; and an active material in operative communication with the at least one padded surface of the body portion, the active material being operative to change at least one attribute in response to an activation signal, wherein a space between the occupant's head and the at least one padded surface decreases with the change in the at least one attribute of the active material.

7 Claims, 13 Drawing Sheets

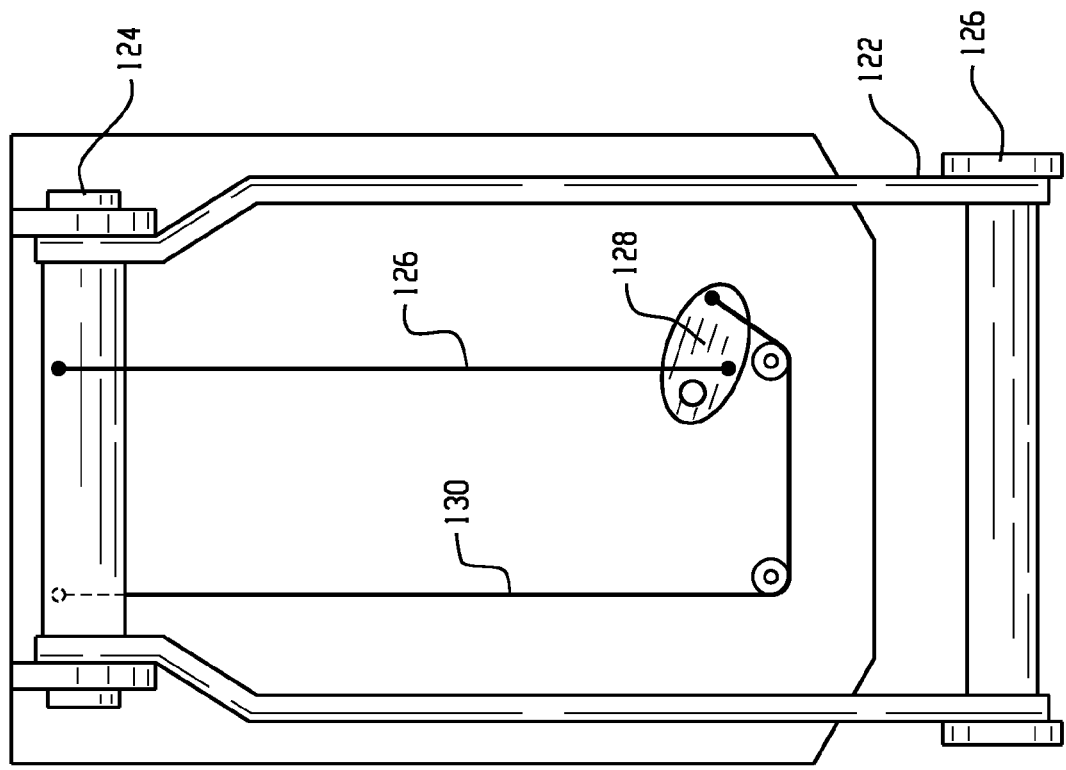
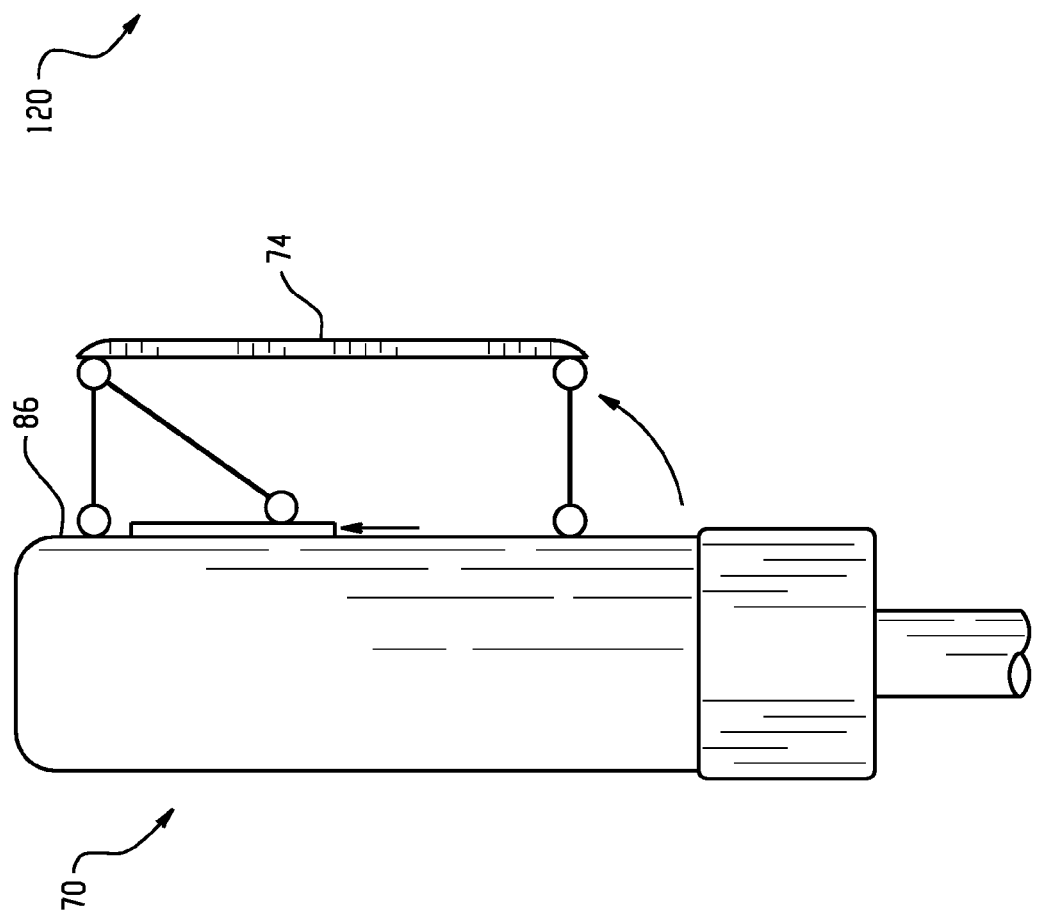

ACTIVE MATERIAL ACTUATED HEADREST ASSEMBLIES

CROSS REFERENCE TO RELATED APPLICATIONS

This application relates to and claims the benefit of priority to U.S. Provisional Application No. 60/733,573 filed Nov. 4, 2005, and U.S. Provisional Application No. 60/792,520, filed on Apr. 17, 2006, incorporated herein by reference in their entireties.

BACKGROUND

The present disclosure relates to a headrest assembly and more particularly, to active material enabled morphable, positionable, and/or changeable/tunable compliance headrest assemblies.

Headrest assemblies are commonly employed in vehicles and are typically adjustably attached to the seatback. The headrest is in alignment with the back of a seated occupant's head to provide comfort, support, and protection during operation of the vehicle. The padded portion of the headrest that is adapted to provide the support and protection is generally fixedly positioned by the end-user.

Occupants of a vehicle tend to position their seat backs at different angles for comfort. For example, vehicle occupants tend to sit more upright in vehicles with higher seating heights such as vans and so-called sport utility vehicles whereas in cars the occupants tend to be in a more reclined position. The changes in seat back position can move the attached headrest further or closer to the head of the seated occupant. That is, the space between an occupant's head and the headrest can be affected and altered by the seat position. The amount of space between the headrest and the occupant's head can vary, which depending on the magnitude of the space, can be undesirable in certain situations or conditions experienced by the vehicle. For example, in some situations it may be desirable for the headrest to be close to or touching the back of the occupant's head.

Any adjustment of the headrest is typically provided by mechanical actuation, which is generally fixed as a function of the end user adjustment of the headrest and the anthropometry of the seated occupant. Conventional actuators are costly, have a large form factor, and, for those actuators that are electrically actuated, have high power consumption. Further, coupling the output of the actuator to the occupant's needs is not a straightforward process, since a wide variety of occupant sizes must be comprehended in the design.

Accordingly, it is desirable to have a morphable headrest that can be selectively and actively positioned, morphed, manipulated, and/or its compliance changed during use as may be deemed to be desirable for different conditions.

BRIEF SUMMARY

Disclosed herein are headrests assemblies employing active material based actuators and processes for reducing a space between a headrest and an occupant's head and/or for altering the compliance of the headrest. In one embodiment, the headrest assembly comprises a body portion having at least one padded surface positioned in substantial alignment with a seated occupant's head; and an active material in operative communication with the at least one padded surface of the body portion, the active material being operative to change at least one attribute in response to an activation signal, wherein a space between the occupant's head and the at least one padded surface decreases with the change in the at least one attribute of the active material and/or the compliance of the headrest may change with the change in the at least one attribute of the active material.

In another embodiment, the headrest assembly comprises at least one support post extending upwardly from the seat; a headrest body attached to the at least one support post; a padded portion in pivotal communication with the headrest body and substantially aligned with a seated occupant's head; and an active material actuator in a cooperative relationship with the padded portion, wherein the active material actuator is adapted to move the padded portion forward and/or upward relative to the headrest body upon receipt of an activation signal.

A process for reducing a space between a headrest and an occupant's head comprises activating an active material based actuator disposed within a headrest supported by at least one support post projecting from a seat; and moving a padded surface forward relative to the at least one support post upon activating the active material based actuator and reducing the space between the headrest and the occupant's head.

The above described and other features are exemplified by the following figures and detailed description.

BRIEF DESCRIPTION OF THE DRAWINGS

Referring now to the figures, which are exemplary embodiments and wherein like elements are numbered alike:

FIG. 8 illustrates a side view of the active material based headrest assembly of FIG. 7;

FIG. 9 illustrates a plan view of an active material based actuation and reset mechanism for an active material based headrest assembly in accordance with another embodiment;

DETAILED DESCRIPTION

Disclosed herein are headrest assemblies that include active material enabled morphing, manipulation, positioning, and/or compliance changing mechanisms, which can be selectively triggered upon receipt of a triggering condition to reduce a gap between a headrest and an occupant's head and/or change the headrests compliance. As will be discussed throughout this disclosure, active materials can be used to overcome many of the disadvantages of conventional actuators used in headrests. Most active material based devices that are envisioned for this use are more robust than strictly electromechanical approaches as they have no mechanical parts, it being the material itself that changes in stiffness and/or dimension. Active material based headrest assemblies also, in almost all cases, emit neither acoustic nor electromagnetic noise/interference.

Further, because of their small volume, low power requirements, and distributed actuation capability, among other attributes, the potential exists that active materials could possibly be embedded into the headrest at various locations to allow tailoring to the needs of the occupant and/or the driving scenario. It is also anticipated that they could also be actuated in a certain sequence or just in select locations to match occupant and situational needs. For example, different regions could be activated to meet the differing needs of an occupant (e.g., an occupant who wants to rest/sleep compared to one who desires to be alert and attentive).

Figure 1:
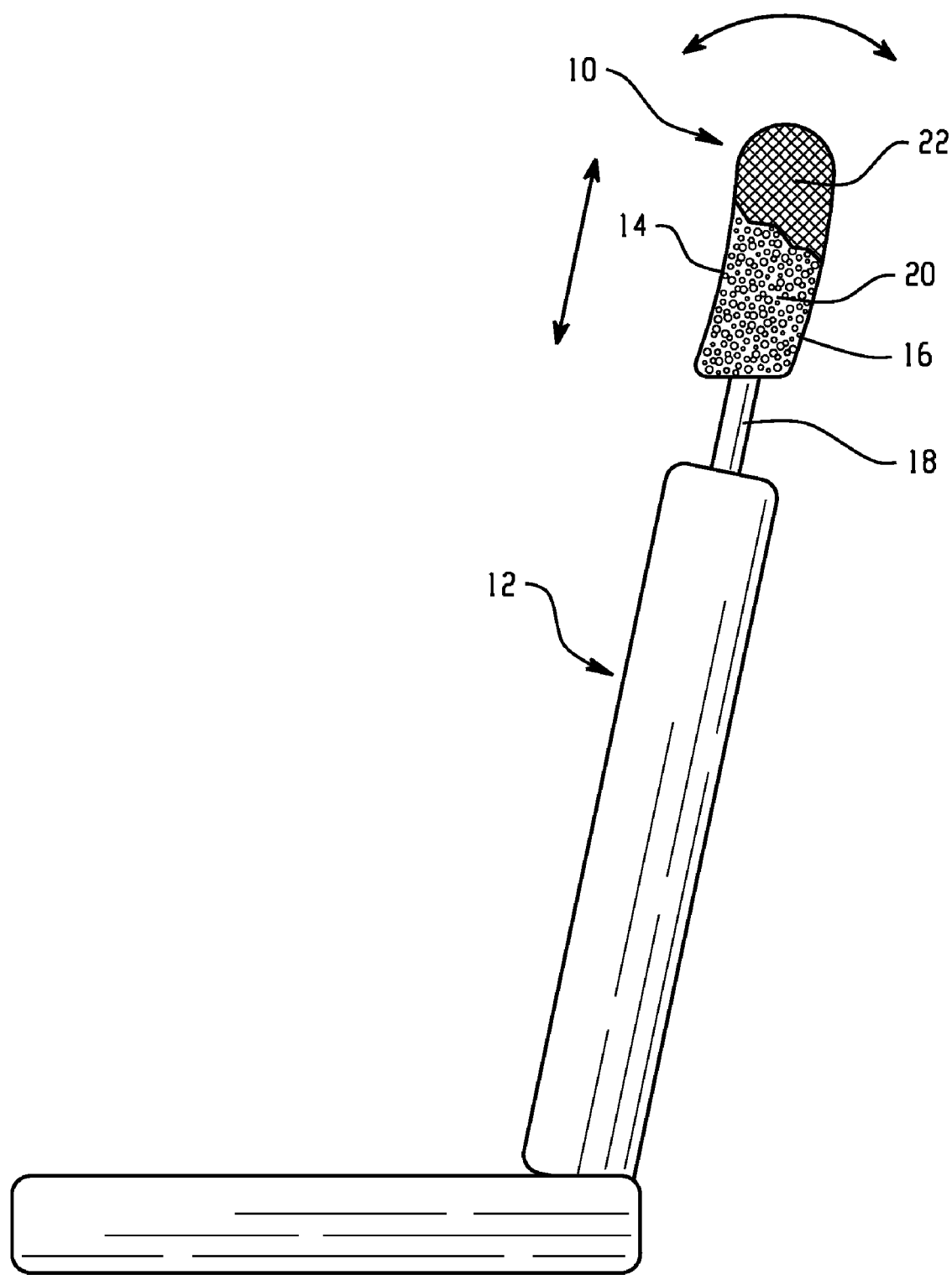
FIG. 1 illustrates a side elevation view of a seat back with a headrest.

FIG. 1 illustrates a headrest 10 for a seatback 12. The headrest 10 includes a front contact portion 14 and a back portion 16. The front contact portion 14 is the portion of the headrest 10 proximate to an occupant's head whereas the back portion 16 is the portion of the headrest distally located relative to the occupant's head. The headrest 10 itself is supported on at least one structural support post 18 slidable disposed within the seatback 12. The headrest generally includes a padding material 20 encased by an outer covering 22, which helps define the overall shape of the headrest, and may be in pivotable communication with the structural support post 18. It is noted that the structural support posts 18 can take any form or configuration in any of the headrests assemblies disclosed herein and are not intended to be limited to that shown. For example, a wishbone or goal post type structure can be used. Moreover, in some embodiments, more than two posts can be employed.

The present disclosure is directed the use of active materials for morphing, manipulating, positioning, and/or changing the compliance of the headrest in response to an applied activation signal, wherein the application of the activation signal can be triggered upon detection of a condition. Active materials are defined herein as those that selectively exhibit a change in a fundamental material property such as stiffness and/or dimension when subjected to an applied field. Suitable active materials include, without limitation, shape memory alloys (SMA), ferromagnetic SMAs (FSMA), and shape memory polymers (SMP). A second class of active materials can be considered as those that exhibit a change in at least one attribute when subjected to an applied field but revert back to their original state upon removal of the applied field. Active materials in this category include, but are not limited to, piezoelectric materials, electroactive polymers (EAP), two-way trained shape memory alloys, magnetorheological fluids and elastomers (MR), electrorheological fluids (ER), composites of one or more of the foregoing materials with non-active materials, combinations comprising at least one of the foregoing materials, and the like. Depending on the particular active material, the activation signal can take the form of, without limitation, an electric current, a temperature change, a magnetic field, a mechanical loading or stressing, or the like. Of the above noted materials, SMA and SMP based assemblies preferably include a return mechanism to restore the original geometry of the assembly. The return mechanism can be mechanical, pneumatic, hydraulic, pyrotechnic, or based on one of the aforementioned smart materials.

Advantageously, the headrest assemblies described herein can be adapted to respond to a dynamic load of an occupant by the inertia provided in a triggering event to morph the headrest to reduce the space between the occupant and the headrest.

Reference will now be made to an embodiment employing a shape memory alloy (SMA) material. Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

The temperature at which the shape memory alloy remembers its high temperature form when heated can be adjusted by slight changes in the composition of the alloy and through heat treatment. In nickel-titanium shape memory alloys, for instance, it can be changed from above about 130° C. to below about −100° C. The shape recovery process occurs over a range of just a few to several degrees and the start or finish of the transformation can be controlled to within a degree or two depending on the desired application and alloy composition. The mechanical properties of the shape memory alloy vary greatly over the temperature range spanning their transformation, typically providing the airflow control devices with shape memory effects, superelastic effects, and high damping capacity.

SMA materials exhibit a modulus increase of 2.5 times and a dimensional change of up to 8% (depending on the amount of pre-strain) when heated above its so-called martensite to austenite phase transition temperature. The SMA can be embedded within the headrest in wire and/or sheet form to provide the desired amount of morphing as well as provide a change in its stiffness properties. SMA changes are also one-way so that a biasing force return mechanism (such as a spring) may be included within the headrest to return the SMA (and the headrest) to its starting configuration once the applied field/heat is removed; when the SMA is not activated.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Figure 2:
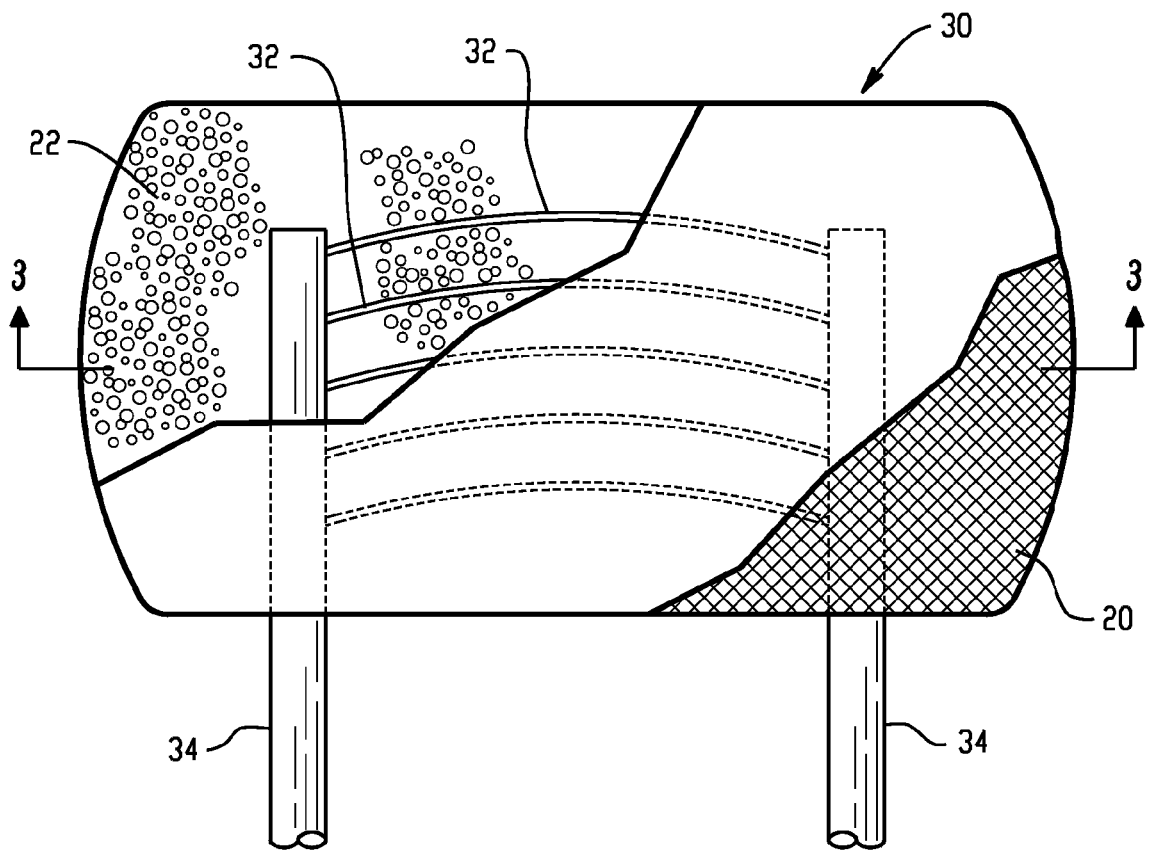
FIG. 2 illustrates a front view of the headrest in accordance with one embodiment of the present disclosure.
Figure 3:
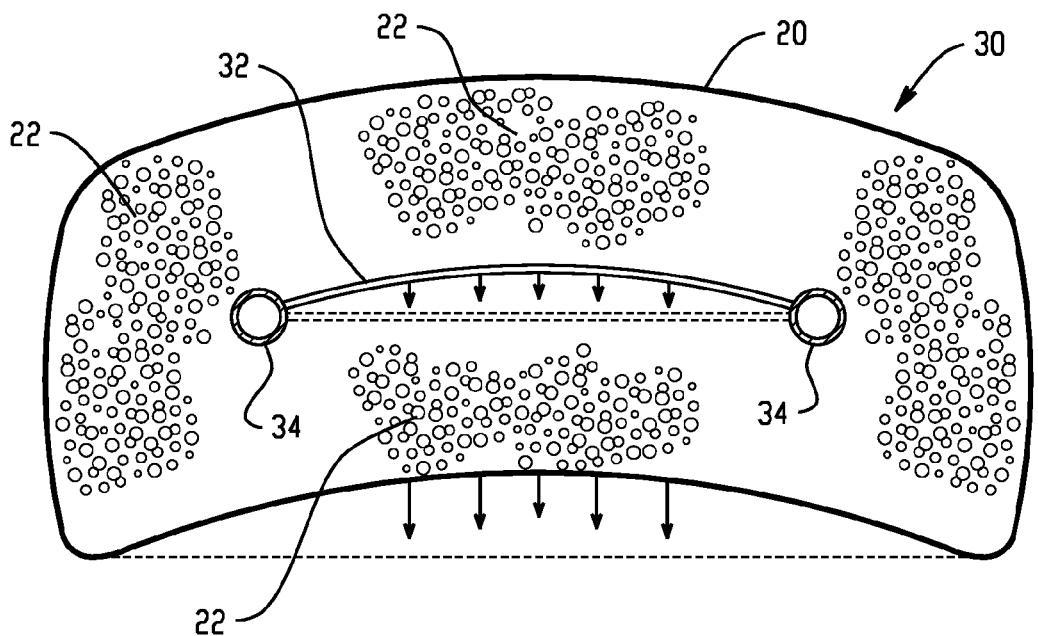
FIG. 3 illustrates a sectional view taken along lines 3-3 of FIG. 2.

In FIG. 2, a headrest 30 comprises a plurality of pre-stretched shape memory alloy wires 32 stretched between two structural posts 34 connecting the headrest 30 to a seatback. The shape memory wires 32 are encased within the headrest. As installed, the shape memory alloy wires 32 are pre-stretched up to 8% based on commercially available shape memory alloys and are placed in a curvilinear relationship between the posts 34, which is shown more clearly in the top down view of FIG. 3. Preferably, the shape memory wires 32 assume a concave shape orientation when viewed from the front to the back of a vehicle in which the seat is disposed. The length of the shape memory alloy wires 32 is chosen such that when activated (e.g., resistive thermal heating, heat from a pyrotechnic event, and the like) the length of the shape memory alloy wires 32 contract and become relatively taut (preferably but not required) between the posts 34. The change in the length dimension of the shape memory alloy wires causes the padding material 22 and covering 20 to move to a different position, such as is illustrated by the dotted line structure in FIG. 3. This movement and change in shape of the headrest 30 is defined herein as morphing. By morphing the headrest 30 with the shape memory alloy, the distance between an occupant's head and the contact surface 14 (see FIG. 1) of the headrest 30 can selectively be made to decrease.

If the starting top down geometry (i.e., the non-activated geometry) of the headrest 30 is concave, activation of the shape memory alloy wires 32 would cause the top down geometry of the headrest 10 to change to a relatively flattened configuration or a convex top down geometry depending on the amount of padding material disposed between the covering and the shape memory alloy wires as well as the original top down geometry. Similarly, if the non-activated geometry of the headrest is flat, actuation would morph the headrest to assume a convex shape geometry. The amount of translation is generally related to the percentage of pre-stretching to the shape memory alloy wires and the distance between the posts 34.

Note that in concave surfaced headrests the pre-stretched wires could be embedded close to the front surface. For flat surfaced headrests, the pre-stretched wires would be embedded well within the padding. Note also that the wires need not necessarily be parallel and could cross in an x or other fashion, and if parallel need not be horizontal.

Figure 4:
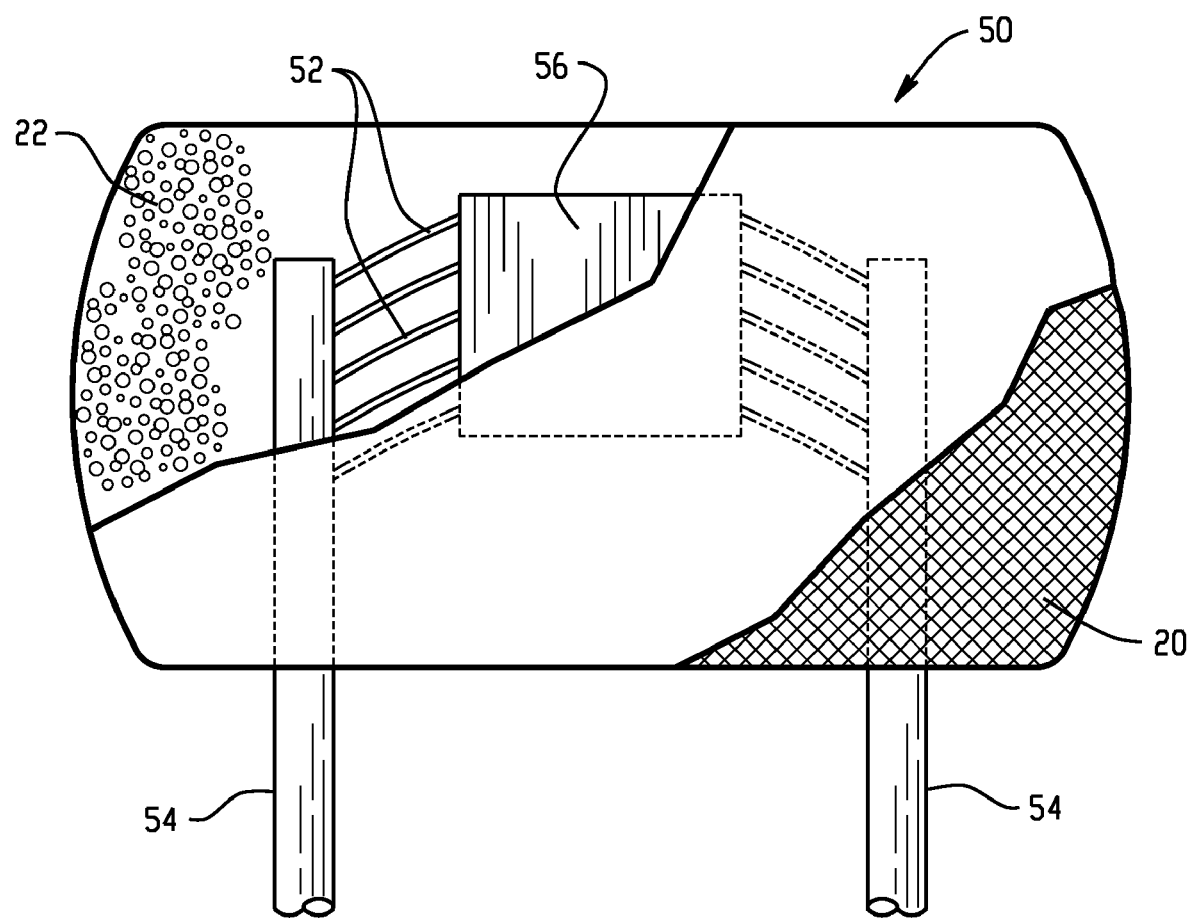
FIG. 4 illustrates a front view of a headrest in accordance with another embodiment of the present disclosure.

In another embodiment shown in FIG. 4, a headrest 50 includes shape memory alloy wires 52 that could alternatively be simply embedded in the padding material 22 or could be looped through/attached to a pad 56 and posts 54 such that activation of the shape memory alloy wire 52 causes the pad 56 (and padding material intermediate the covering and pad) to move forward relative to the occupant's head. Another aspect of using shape memory alloy wires 52, is that activation of the wires increases the modulus to increase by a factor of approximately 2.5 times depending on the particular composition. Activation of the shape memory alloy material causes a phase transformation from a martensite phase to an austenite phase. Consequently, the stiffness/compliance of the headrest can be increased from normal operation to as much as a 2.5 times higher level, which may be beneficial in some conditions. Note also that by activating only selected ones of the wires that the stiffness of the headrest pad could be adjusted/tuned for different conditions based on occupant anthropometries and seating geometries/conditions as well as the type and magnitude of the triggering event.

In another embodiment, the pads 56 are formed of piezoelectric unimorph or bimorph patches. In general, piezoelectric materials exhibit small changes in dimensions when subjected to an applied voltage. Their response is proportional to the strength of the applied field and is quite fast being capable of easily reaching the thousand hertz range. Because their dimensional change is small (<0.1%), to dramatically increase the magnitude of dimensional change they are usually used in the form of piezoelectric uni-morph and bi-morph flat patch actuators that are constructed so as to bow into a concave or convex shape upon application of a relatively small voltage. The rapid morphing/bowing of such patches within the headrest is suitable for headrest morphing though delivered displacement forces that are significantly less than those achievable with current SMA's. Moreover, piezoelectric patches return automatically to their original geometry once the filed is removed which would allow automatic resetting of headrest geometry. Another advantage of the piezoelectric materials is their rapid actuation times; typically on the order of milliseconds.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Figure 5:
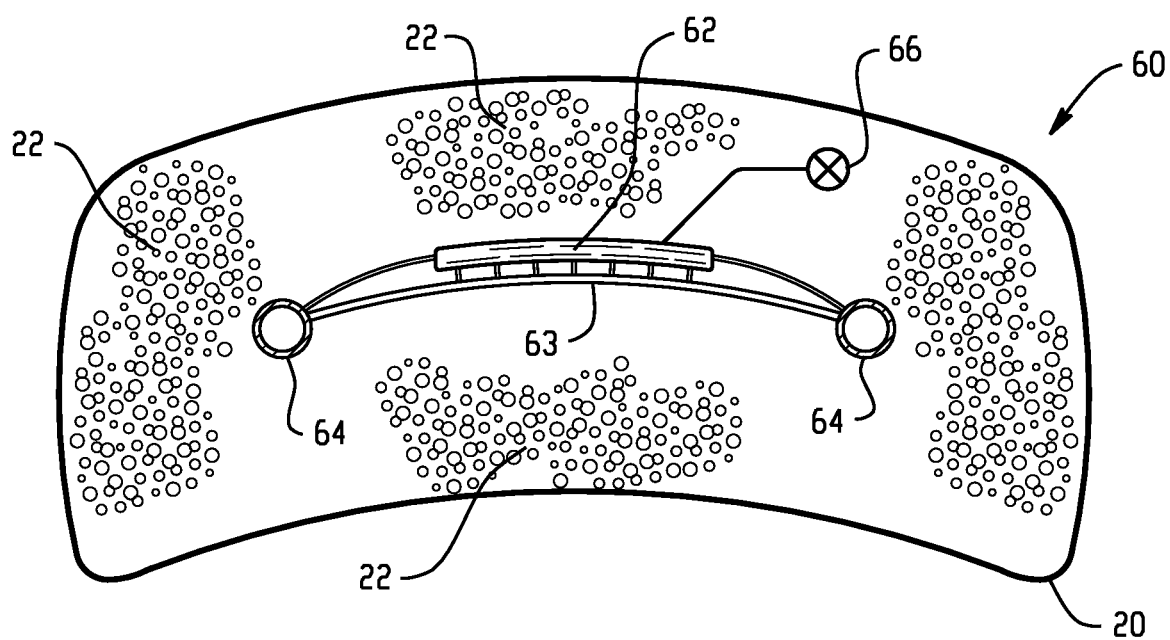
FIG. 5 illustrates a top sectional view of a non-activated headrest in accordance with one embodiment of the present disclosure.
Figure 6:
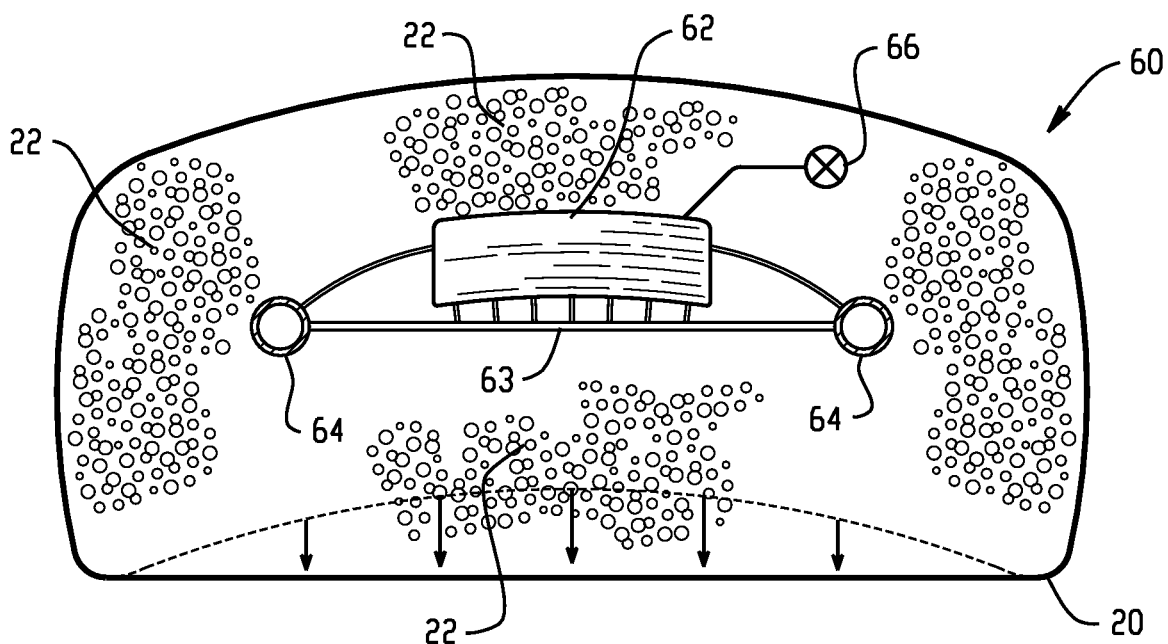
FIG. 6 illustrates the headrest of FIG. 5 after activation.

FIGS. 5 and 6 illustrate an additional embodiment, wherein headrest 60 includes a bladder 62 in cooperative communication with the active material 64. The bladder can be supported between support posts 64 and may have one portion tethered to the active material 64. Forward movement of the contact portion of the headrest 60 due to activation of the active material could result in air being sucked into an expanding cavity of the bladder 62 within the headrest through a one-way valve 66 providing a pressurized restraint upon loading. Alternatively, a ratchet based mechanism can be used that would be extended by the expansion of the headrest and would provide additional resistance/energy absorption capability upon loading of the front surface of the headrest by the occupants' head.

Figure 7:
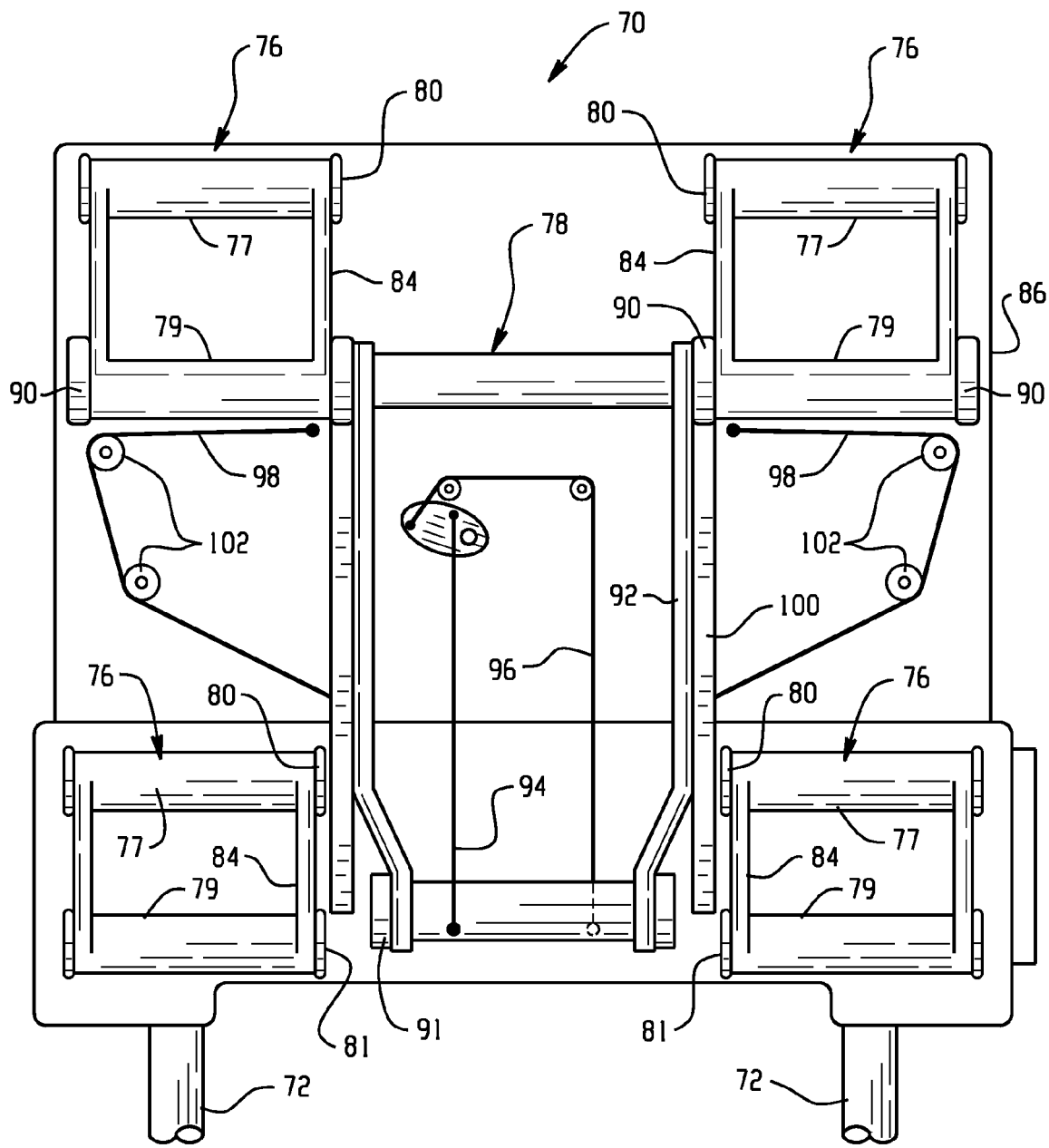
FIG. 7 illustrates an elevational view of an active material based headrest assembly in accordance with another embodiment.

FIGS. 7 and 8 illustrate an alternative embodiment of a headrest assembly 70 supported by support posts 72. In this embodiment, the headrest assembly is adapted to selectively deploy a padded plate portion 74 (see FIG. 8) forward and/or upward relative to the support posts 72. The headrest assembly includes a four bar linkage assembly 76 that pivotally moves the padded plate portion 74 when an active material actuator 78 is selectively activated. Each bar linkage 76 includes an upper bracket portion 77 and a lower bracket portion 79. The upper bracket portion 77 includes an axle 80, and is rotatably attached to a headrest body portion 86. The lower portion 79 also includes an axle, either 81 or 90 depending on the location of the bar linkage 76, and is rotatably attached to the padded plate 74. Each bracket portion 77, 79 further includes bearing means supporting the bracket 84 for rotation relative to the respective axle.

Similar to the bar linkages 76, the actuator 78 includes a bracket 92 rotatably supported at each end by axles 90, 91 and configured for moving the padded portion 74 forward and upward so as to reduce a space between an occupant's head and the padded portion. The actuator 78 further includes bearing means (not shown) for supporting the bracket 92 for rotation relative to the axles 90, 91. Axle 90 as shown is common to and in rotatable communication with the lower portion 79 of the upper brackets 84. Axle 91 is rotatably attached to the headrest body 86. As such, the actuator 78 is pivotably attached to the headrest body portion 86 and the padded portion 74 by way of the axles 90, 91 such that movement of the padded portion relative to the headrest body portion pivotably moves each bar linkage 76. An active material is in operative communication with the bracket 92 to effect selective rotation and movement of the actuator. Using shape memory allow wires as an example, the actuator 78 includes one SMA wire 94 for lifting of the bracket 92 (and moving the padded portion) and a second SMA wire 96 (or a different type of active material or a bias spring mechanism) in biased communication with the bracket 92 to reset the padded portion back to its original position. The reset mechanism may further include a ratchet mechanism to lock the padded portion when in a raised position. The ratchet mechanism may be controlled with active materials such as is shown in FIG. 7. For example, an active material 98 may be in operative communication with a ratchet release 100 to permit resetting of the padded portion. Upon activation of wire 98, the ratchet release would pull away from engagement with underlying ratchet teeth. Although not shown, the ratchet teeth that would engage the ratchet release during use and when the active material is not activated. The active material 98 may be disposed about pivot points 102 so as to provide leverage for release of the ratchet mechanism. The actual ratchet mechanism is not intended to be limited to any particular type and generally includes one or more unidirectional engaging portions that are configured to engage complementary portions disposed on or in operative communication with the bracket.

FIG. 9 illustrates an active material based actuator 120 suitable for use in the headrest assembly 70 in place of actuator 78. The active material based actuator 120 in accordance with this embodiment includes a cam mechanism for actuating and resetting the actuator 120. Resetting is in concert with the ratchet mechanism as previously described. Again using SMA wires as an exemplary active material, at least one SMA wire 126 is configured to rotate a bracket 122 about axle 124 to effect movement of the padded portion (as generally shown in FIG. 8). One end of the SMA wire 126 is attached to the axle 124 and another end is attached to the cam 128. A second SMA wire 130 is configured to provide counter rotation of the bracket 122 so as to reset the actuator. As such, activation of SMA wire 126 will effect rotation of the bracket about axle 124, which will effect rotation of the lower portion about axle 126, thereby moving the padded portion 74 upward and away from the headrest body 86 (see FIG. 8). For example, one end of SMA wire 126 is attached in a clockwise direction about axle 124 whereas one end of SMA wire 130 is attached in a counter-clockwise direction such that activation and subsequent contraction of the particular activated SMA wire will cause rotation about the axle in a direction generally dependent on the SMA wire that is activated.

Advantageously, the second SMA wire 130 also provides an avenue for strain relief of the activated wire e.g., 126. If bracket 122 is blocked from moving, the activated wire 126 will cause the cam 128 to rotate, which stretches wire 130. This way, if the head makes contact with the headrest before the actuator is fully deployed, the extra wire strain can be directed elsewhere, so the headrest will not push the occupants head forward.

Figure 10:
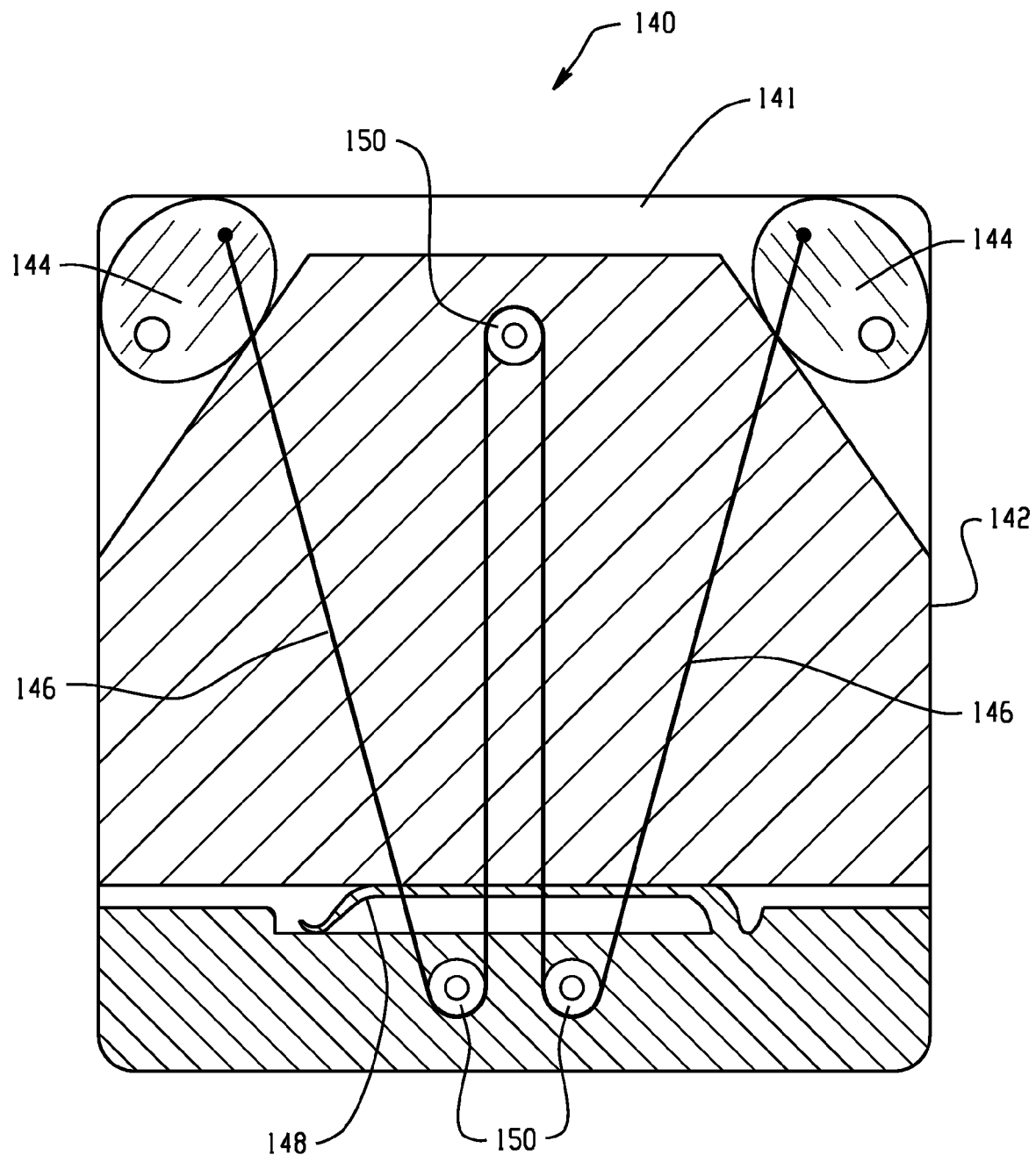
FIG. 10 illustrates a plan view of an active material based reset mechanism for an active material based headrest assembly in accordance with another embodiment.

FIG. 10 illustrates an exemplary unidirectional locking assembly 140 that can be used to effect engagement and release of engaging portions of a frictional locking mechanism. During operation, the locking assembly 140 would slide in a track, constraining the left and right sides of the mechanism. A locking plate 142 is disposed in operative communication with an active material based actuator in operative communication with a cam 144 (two of which are shown) disposed on backing plate 141. The locking plate 142 would interface with the rest of the mechanism, and would be engaged by applying a force in the upward direction. The motion of the plate would psuedoplastically stretch SMA wire 146 as the wedge-shaped upper end of the locking plate 142 would rotate the cams outward, making contact with the tracks and thus locking the entire mechanism (the locking and back plate) into that position within the track. The active material 146 is configured to move the cams 144, which effects movement of the locking plate 142 relative to the backing plate 141. As shown, movement of the cams 144 and locking plate 142 upon activation of the active material would cause the locking plate to first contact, then compress an engageable finger portion (i.e., leaf spring) 148. Once this occurs, the cams would no longer contact the tracks, allowing for free motion of the locking assembly (140). The shape memory alloy wire may be disposed about one or more pulleys 150 such that activation of a single active material component causes rotation of the cams 144, which are biased against the sliding plate 142 resulting in compression of the engageable finger portion 148. Deactivation of the active material causes the engageable finger portion to move the locking plate back to its original position, allowing free sliding but ready to repeat the locking process if the locking plate is once again forced upward by the rest of the mechanism.

Figure 11:
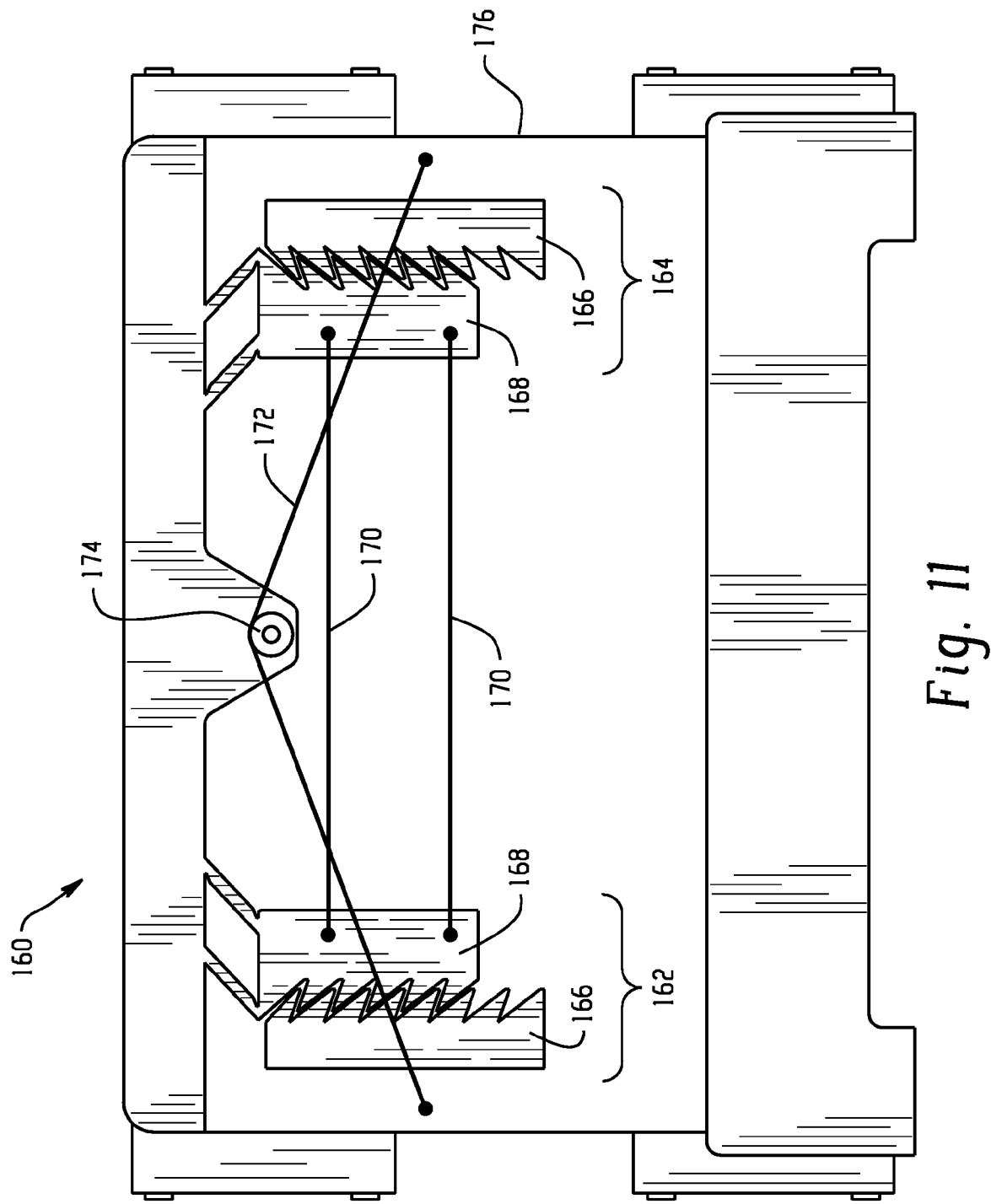
FIG. 11 illustrates a plan view of an active material based actuation and reset mechanism for an active material based headrest assembly in accordance with another embodiment.
Figure 12:
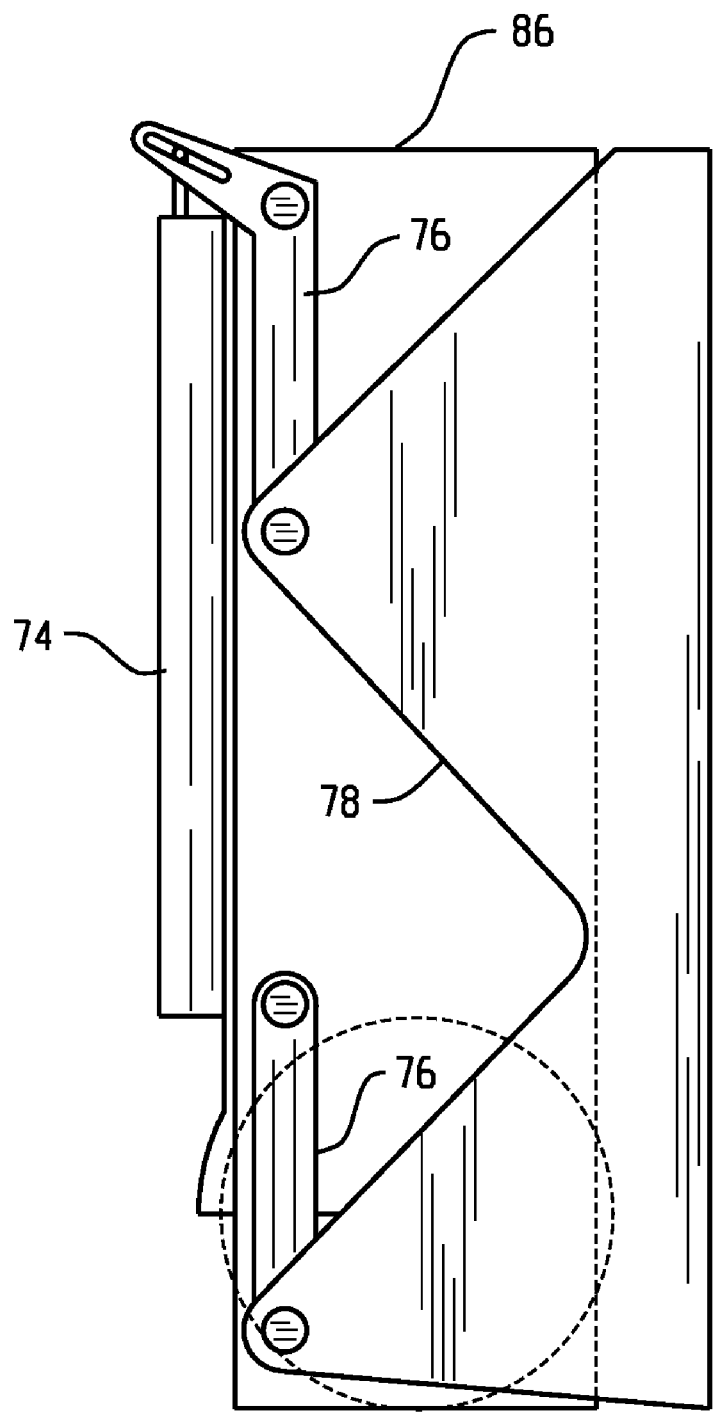
FIG. 12 illustrates a side sectional view of the active material based headrest assembly of FIG. 11.

FIGS. 11 and 12 illustrate an alternative embodiment of an active material based actuator 160 suitable for use with the headrest assembly that provides forward and/or upward movement of a padded portion relative to an occupant's head. The locking assembly includes two sets 162, 164 of opposing serrated rails 166, 168. The individual teeth of each set of rails are configured to provide, when engaged, sliding movement in one direction and prevent movement in the other direction. An active material 170 is in operative communication with one of the rails to selectively release the engaging relationship with the opposing rail, thereby permitting the unengaged rails to slide in both directions. As a result, the rails can be reset to its original position. As shown, the active material 170 is attached to rail 168 of each set 162, 164. Using shape memory alloys as an exemplary active material, activation of the shape memory alloy 170 can cause a dimension change (contraction), which causes the rails 168 to inflect inwardly and separate its serrated teeth from engagement with the opposing rail, i.e., 166. A second active material 172, e.g., a shape memory alloy, can be configured to provide unidirectional movement, which can be used to provide forward and/or upward movement of a padded portion. The second active material is shown positioned about a pivot point 174 and is attached at each end to the headrest body 176. In this manner, the padded surface 74 can be made to move forward relative to the headrest body 86.

Figure 13:
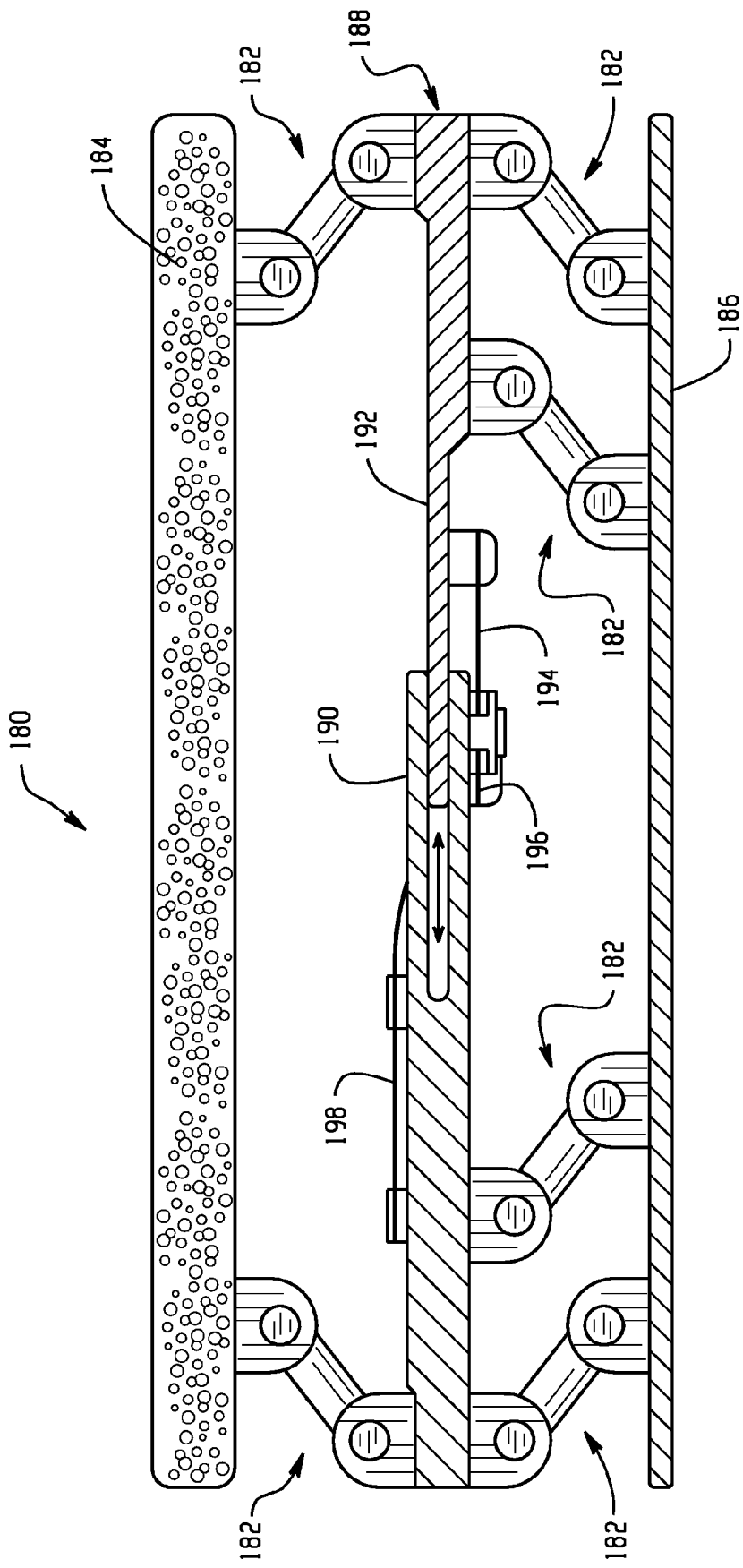
FIG. 13 illustrates a top down sectional view of an active material based headrest assembly in accordance with another embodiment.
Figure 14:
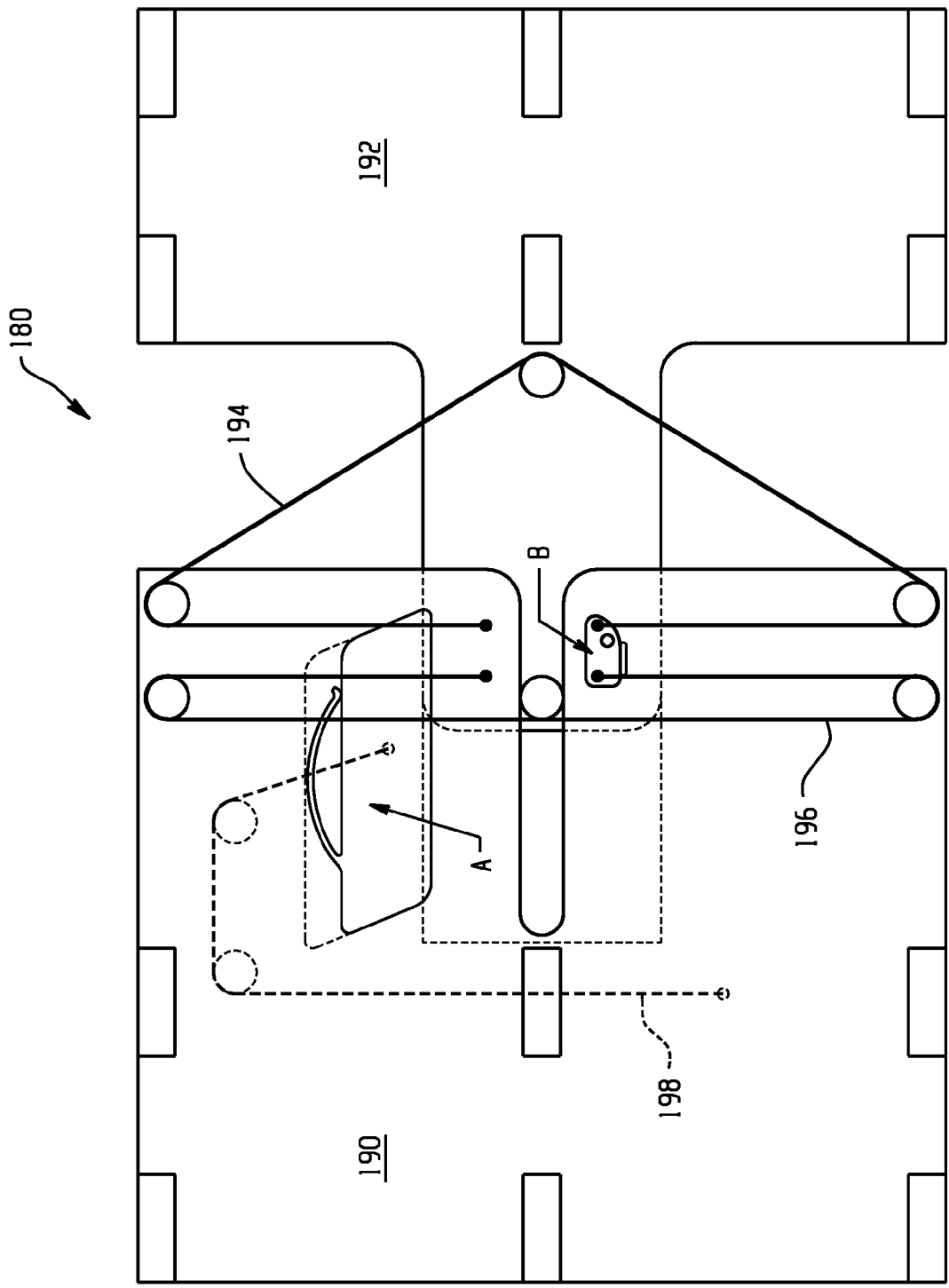
FIG. 14 illustrates a plan view of the active material based headrest assembly of FIG. 13 showing the reset mechanism.

FIGS. 13 and 14 illustrate a headrest assembly 180 utilizing an active material based mechanical bellows type mechanism. A plurality of hinges 182 is utilized to provide forward movement of the padded portion 184 relative to a stationary portion 186. The hinges are in operative communication with slidable member assembly 188, which includes a fork 190 and a slidable member 192 in sliding engagement with the slidable member portion. A first active material 194, e.g., a shape memory alloy wire, is attached to the fork and sliding member portion to cause the sliding member portion to slide towards a bridging surface connecting the individual tines of the fork. In this manner, the hinges push the padded portion 74 forward relative to the stationary portion 86 as shown in FIG. 8. A second active material 196, e.g., a second shape memory alloy wire, can be configured to provide a restoring force using linear motion as shown more clearly in FIG. 14. Optionally, it should be apparent that the fork 190 and slidable member 192 can be oriented horizontally rather than vertically as shown.

As shown more clearly in FIG. 14, the reset mechanism includes SMA wire 194 that is configured to slide the slidable member assembly 180 against the unidirectionally oriented ratchet teeth, which are configured to prevent motion to the right, for example, when engaged. A second SMA wire 196 is configured to provide selective release of the ratchet teeth, thereby permitting movement to the right so that the assembly can be reset. A third SMA wire 198 is configured to provide the release of ratchet leaf spring assembly (A). It should be noted that the ratchet leaf spring assembly could be mirrored on an opposing side of the fork 190. Also, shown in FIG. 14 is a motion limiter B. The motion limiter includes a cam to which one end of wires 194 and 196 are attached. As such, upon contact of the padded portion 74 with the occupant's head, for example, continued forward motion will be limited, and the excess strain of the active material (194) would rotate the limiter (B), pseudoplastically stretching the other active material (196).

Figure 15:
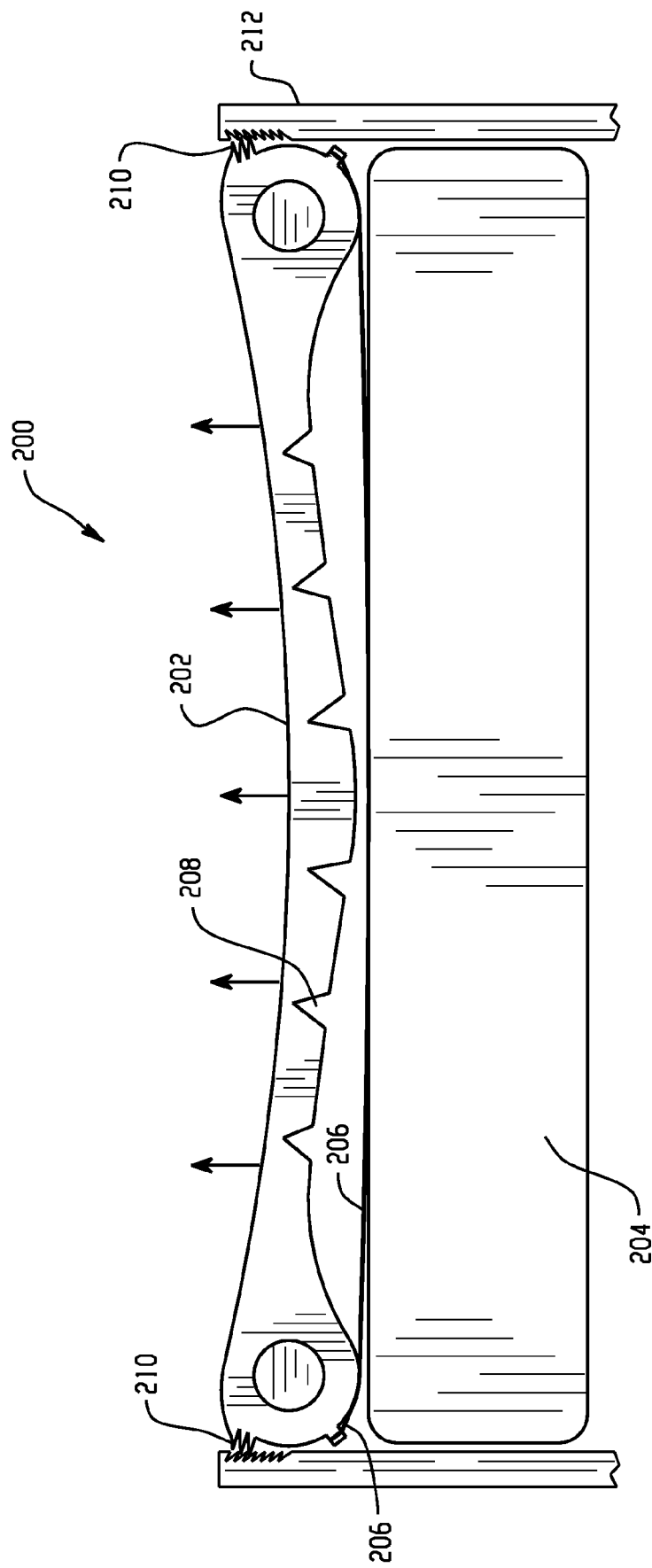
FIG. 15 illustrates a top down sectional view of an active material based headrest assembly in accordance with another embodiment.

FIG. 15 illustrates a headrest assembly 200 utilizing an active material stiffening mechanism. The assembly includes a flexible member 202 that outwardly flexes relative to a stationary portion 204. An active material, 206 e.g., a shape memory alloy wire, is tethered to each end of the flexible member. The flexible member includes a plurality of notches 208 along an inner surface to accommodate the outward flexure. The flexible member can further include an engageable portion 210 that can be used to engage an opposing surface 212 having a serrated surface in a ratchet-like fashion. The location of the ratchet portion is not intended to be limited to the locations show. For example, a ratchet can be formed in front of the flexible member or behind its pivot point. It should be apparent to one of skill in the art that orientation of the ratchet teeth is unidirectional. That is, rotation of the engageable portion 210 against the ratchet teeth can occur in a clockwise direction, for example, but is prevented in a counter-clockwise direction.

Figure 16:
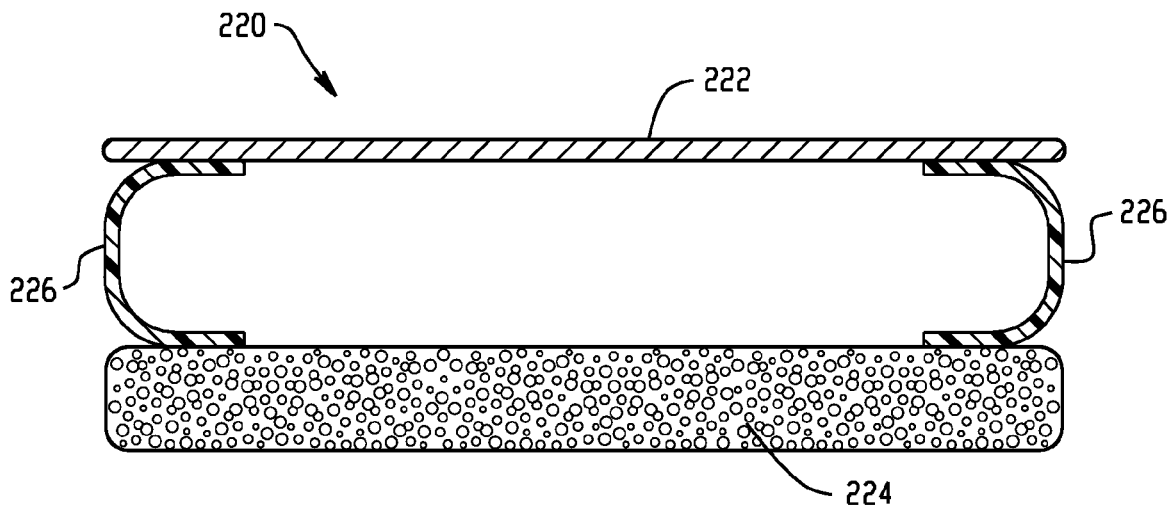
FIG. 16 illustrates a top down sectional view of an active material based headrest assembly in accordance with another embodiment.

FIG. 16 illustrates a headrest assembly 220 that utilizes inherent properties provided by the active material that occur upon activation and deactivation. The headrest assembly includes a stationary portion 222 and padded portion 224. Intermediate the stationary and padded portions are bands of the active material 226. For example, superelastic shape memory alloy bands can be utilized such that as the temperature is increases the bands stiffen.

Figures 17A, 17B:
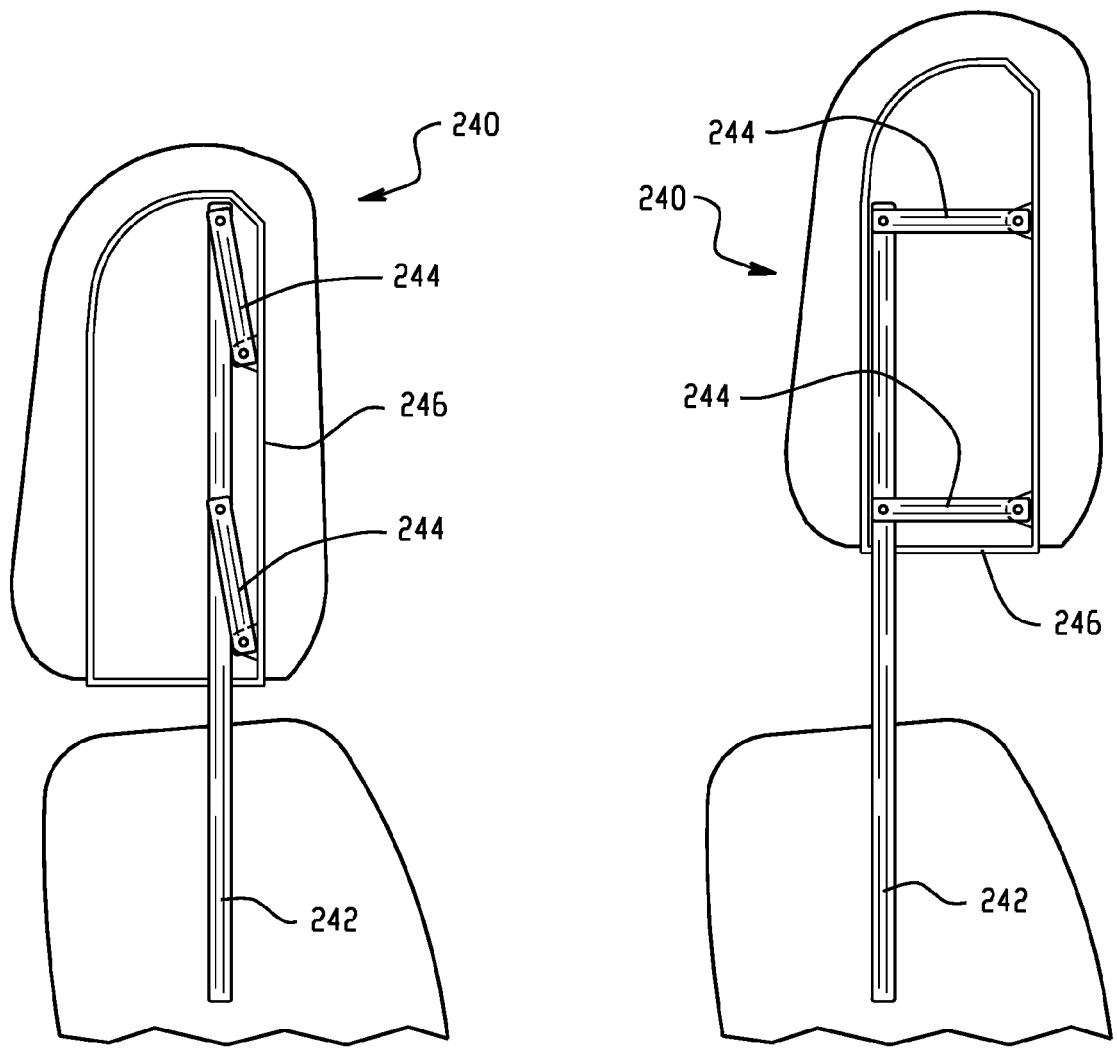
FIGS. 17A and B illustrate a side sectional view of an active material based headrest assembly in accordance with another embodiment.

Although reference has been made to movement of a padded portion relative to a stationary surface, other embodiments utilizing similar concepts can be used. For example, the active material based actuator can be configured within a box that provides forward and upward movement of the headrest. FIGS. 17A and B illustrate one such embodiment of a headrest 240. A headrest portion 246 is configured to move forward and upward relative to the support members 242. Hinge members 244 are pivotally attached at one end to the support posts and at the other end to the headrest portion 246. An actuator and ratchet system such as those disclosed above can be used to effect movement of the hinge member.

Although specific reference has been made to the use of shape memory alloys and piezoelectric materials, it is to be understood other active materials can be used. For example, electroactive polymers, magnetorheological (MR) fluids, electrorheological fluids, MR polymers, ferromagnetic magnetostrictives, and shape memory polymers could be used, most individually, but some like MR in combination with others, to effect the dimensional and stiffness changes in the headrest as described above.

EAP's are essentially a laminate consisting of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. EAP patch vibrators have been demonstrated (by the company Artificial Muscle Inc. at 2005 SPIE Conference). Their major downside is that they require applied voltages approximately three orders of magnitude greater than those required by piezoelectrics.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

MR fluids and elastomers exhibit a shear strength that is proportional to the magnitude of an applied magnetic field. Property changes of several hundred percent can be effected within a couple of milliseconds this making them eminently suitable for vibratory in addition to step function property change input, in this case in terms of the stiffness/geometry of the headrest.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like.

The particle size should be selected so that the particles exhibit multiple magnetic domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

ER fluids are similar to MR fluids in that they exhibit a change in shear strength when subjected to an applied field, in this case a voltage rather than a magnetic field. Response is quick and proportional to the strength of the applied field.

MR polymers typically consist of iron particles embedded in a highly flexible polymer matrix. Applying a magnetic field will cause a change in stiffness and potentially shape of the MR polymer. Stiffness and shape changes are proportional to the strength of the applied field and can be quite rapid. The issue here of greatest difficulty is the packaging of the field generating coils.

Ferromagnetic SMA's exhibit rapid dimensional changes of up to several percent in response to (and proportional to the strength of) an applied magnetic field. Downsides are the fact that the changes are one-way changes and require the application of either a biasing force or a field reversal to return the ferromagnetic SMA to its starting configuration.

Magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferrimagnetic solids. Terfinol D is the most thoroughly explored form of magnetostrictive. Magentisricgtvies exhibit a relatively high frequency capability, strain is proportional to the strength of the applied magnetic field, and these types of materials return to their starting dimension upon removal of the applied field.

Shape memory polymers (SMP) exhibit a dramatic drop in modulus when heated above the glass transition temperature of that of their constituents that has a lower glass transition temperature. If loading/deformation is maintained while the temperature is dropped, the deformed shape will be set in the SMP until it is reheated while under no load under which condition it will return to its as-molded shape. When heated their modulus drops by a factor of 30 or more and in this flexible state the stored energy could no longer be blocked by the SMP and would thus be released in this manner allowing the front surface of the headrest to be displaced toward the head of the seated occupant.

Most SMPs exhibit a "one-way" effect, wherein the SMP exhibits only one permanent shape. Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 20° C. Another temperature for shape recovery may be greater than or equal to about 70° C. Another temperature for shape recovery may be less than or equal to about 250° C. Yet another temperature for shape recovery may be less than or equal to about 200° C. Finally, another temperature for shape recovery may be less than or equal to about 180° C.

Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

Optionally, a position determining system may be provided on the vehicle, e.g., in the seat, for determining the position of the occupant's head and/or neck. As such, the positioning system may be designed to adjust the position of the support structure based on the determined position of the occupant's head and/or neck. In other embodiments, a sensor can be used in combination with the activation device to provide the applied field upon a triggering event. In this manner, actuation of the active material causes the contact surface of the headrest to move forward and reduce a space between the contact surface of the headrest and an occupant's head, if present. Advantageously, the change in spatial distance provided by active material can also provide changes in stiffness properties to the headrest, can be used to change the energy absorption properties of the headrest, and further can allow the headrest to be selectively tuned based on the sensor input. For example, the anthropometry properties of the occupant, e.g., weight, height, size, weight distribution, and the like, as well as seated geometry, e.g., leaning back, leaning forward, head location with respect to the headrest, and the like can be input variables for morphing the headrest at an appropriate time and amount. For example, various sensors such as pressure sensors, position sensors (capacitance, ultrasonic, radar, camera, and the like), displacement sensors, velocity sensors, accelerometers, and the like can be located in and about the vehicle seat and headrest and in operative communication with a controller for regulating and activating the active material to effect the desired amount of headrest morphing. In this manner, the headrest may respond actively for preconditioning prior to a discrete event, for example. A pre-setting occupant identification feature could be used equivalent to the seat memory selection switch.

It is to be understood that in various other embodiments, combinations of different materials can be used to make active structures (e.g., composite/sandwich plates, hinges, frames, pivots, and the like). For instance, as discussed above, a shape memory alloy in any shape (wire, ribbons, and the like) can be embedded in an elastic matrix (polymer or any soft material) to improve protection of the wires and/or vibration control and energy absorption. Moreover, combinations of shape memory alloys and shape memory polymers provide a wide range of movements and ways to control them. Superelastic shape memory alloys are not only useful for energy absorption or places where large deformations are needed. Structures that need a high initial stiffness, but low force requirements to deform them can also be made of these materials (e.g., superelastic multiple-stable hinges for highly stable positions that do not require an excessive force/torque to change positions.

Further, while some applications of the headrest are discussed above, the use of active materials for reshaping and/or changing the modulus of the headrest has potentially wide application. Indeed, they can be used to aid the driver in conjunction with various sensor based comfort, convenience, and protection systems such a park assist for rearward vision (an example being decreasing the size of, moving, or rotating the headrest out of the field of vision during backing up, and repositioning it slowly as the vehicle is placed in any other gear. Another advantage of using active materials is that they would permit personalization of the magnitude and/or nature of the changes effected in the headrest.

The active headrests disclosed herein can be employed in front seats, back seats, child seats, any seat in a car or vehicle transportation, including other industries like airlines, entertainment seats, home, and the like, inclusive of selling something in the aftermarket, as an add-on that may be placed over or on something and functioning as a modifiable headrest for comfort. Other functions can include vibration (for example, with an EAP or piezoelectric patch), which can be used for massaging. Another application is snoozing headrests for child seats when the child is asleep.

Advantageously, the headrests described herein are easily movable allowing a wide range of headrest positions for the occupant's comfort and protection that can be set on demand.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A headrest assembly for a seat, comprising:
   at least one support post extending upwardly from the seat;
   a headrest body attached to the at least one support post;
   a padded portion in pivotal communication with the headrest body and in substantial alignment with a predetermined point, wherein the padded portion comprises a linkage assembly; and
   an active material actuator in a cooperative relationship with the padded portion, wherein the active material actuator is adapted to move the padded portion forward and/or upward relative to the headrest body upon receipt of an activation signal; and
   wherein the active material based actuator comprises a bracket, an axle for rotatably supporting the bracket at each end, and a first shape memory alloy wire adapted to rotate the bracket upon activation of the first shape memory alloy wire.

2. The headrest assembly of claim 1, further comprising a ratchet mechanism in cooperative relationship with the padded portion and configured to permit forward movement of the padded portion while preventing backward movement.

3. The headrest assembly of claim 2, wherein the ratchet mechanism comprises an additional active material configured to selectively release the ratchet mechanism and permit the padded portion to be restored to an original position.

4. The headrest assembly of claim 1, wherein the padded portion is pivotally attached to the headrest body.

5. The headrest assembly of claim 1, further comprising a sensor in operative communication with an activation device for triggering the activation signal.

6. The headrest assembly of claim 1, further comprising a second shape memory alloy wire configured to provide counter-rotation of the bracket upon deactivation of the first shape memory alloy wire.

7. The headrest assembly of claim 1, wherein the active material is configured to restrain forward movement during contact with the predetermined point.

* * * * *